Jan. 30, 1951 E. L. WILKINS 2,539,881
TOPPING MEANS FOR BEET HARVESTERS
Filed Aug. 29, 1946 4 Sheets-Sheet 1

INVENTOR.
EDWARD L. WILKINS
BY Victor J. Evans & Co.
ATTORNEYS

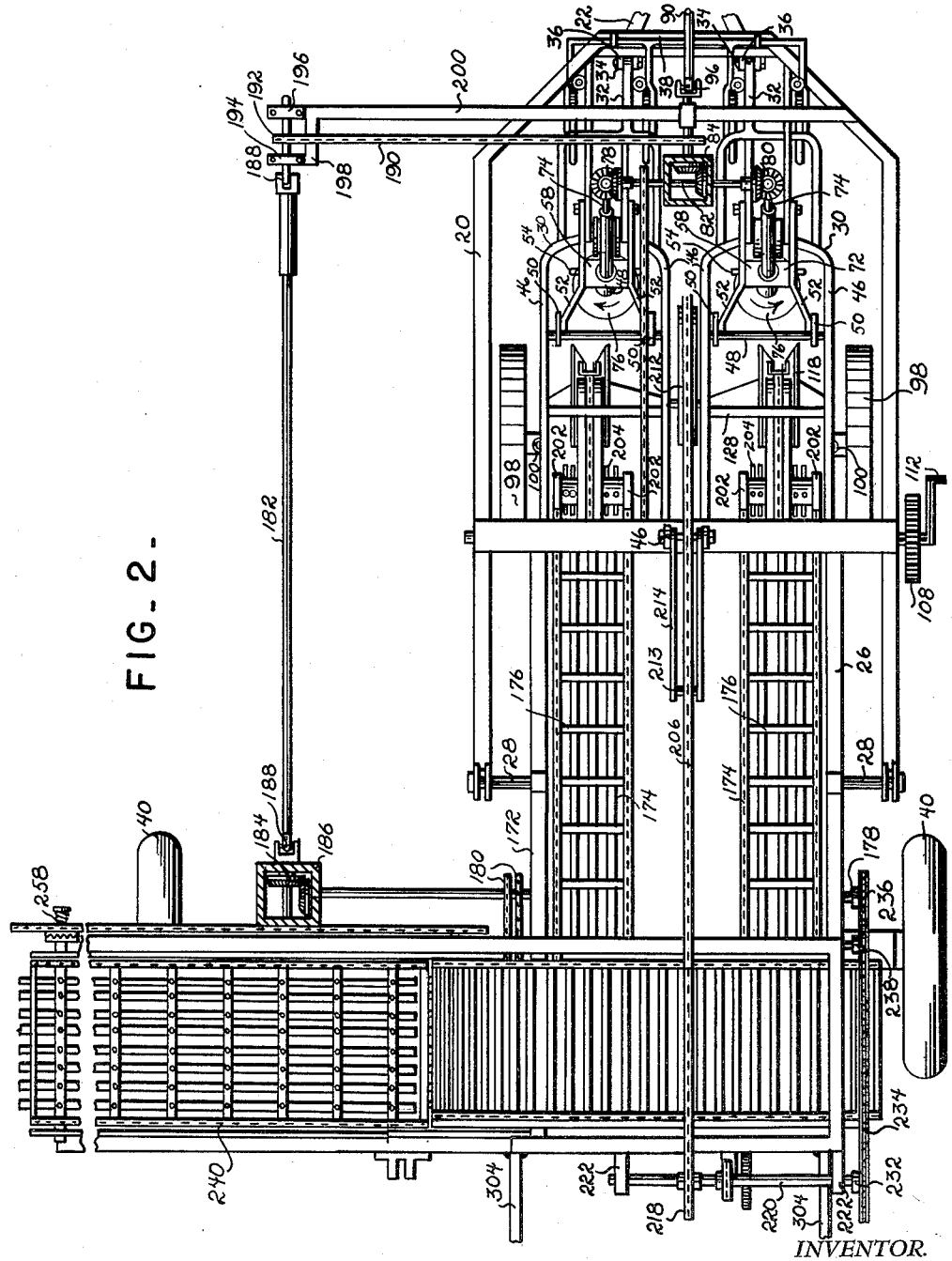

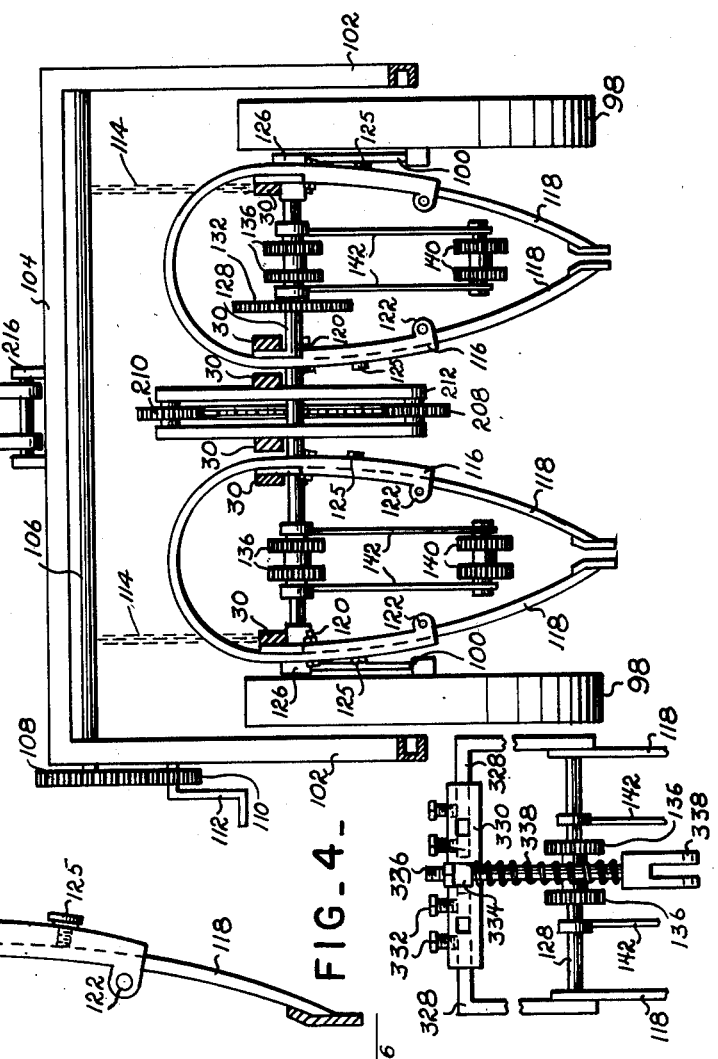

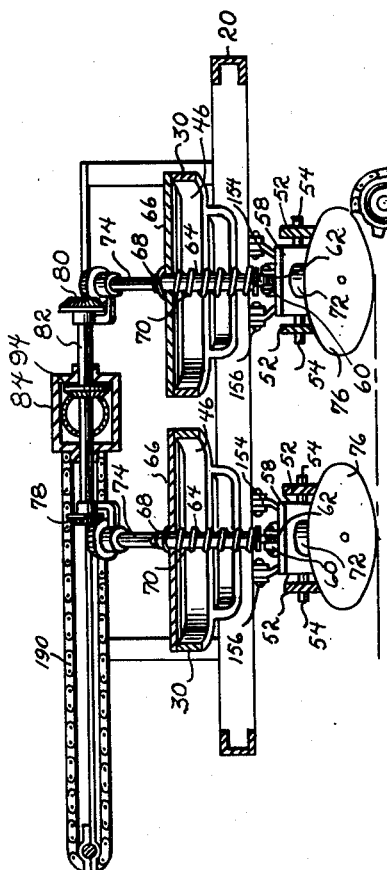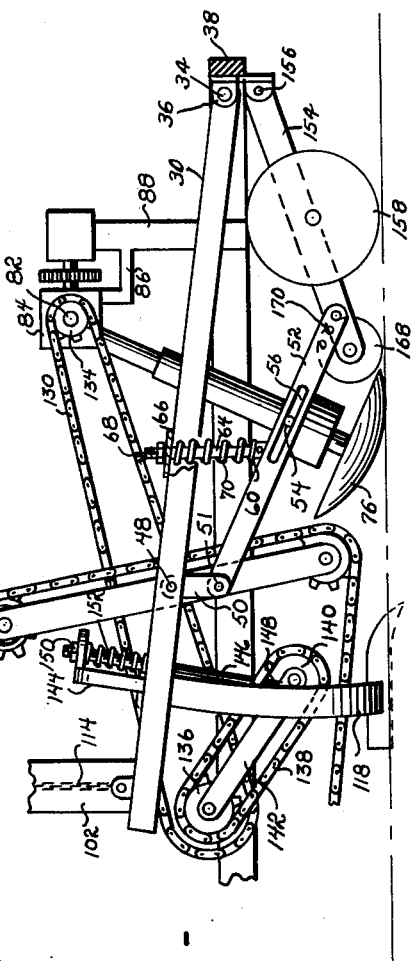

Patented Jan. 30, 1951

2,539,881

UNITED STATES PATENT OFFICE 2,539,881

TOPPING MEANS FOR BEET HARVESTERS

Edward L. Wilkins, Las Animas, Colo.

Application August 29, 1946, Serial No. 693,716

3 Claims. (Cl. 56—121.4)

The invention relates to improvements in harvesting machines, and more especially to an improved topping means for beet harvesters.

The primary object of the invention is the provision of a machine of this character, wherein growing beets within the soil are topped, trimmed, lifted and loaded into a truck or wagon in a single operation of the machine, the topper and lifter units of the machine being susceptible of independent use from the loading unit optional with the operator, and where the soil is not in condition for the combined use of these units.

Another object of the invention is the provision of a machine of this character, where in a single operator only is required for the servicing of the machine, the latter being drawn by a tractor or the like and straddles two rows of a crop of beets at a time, and the topping unit is such that it can be disconnected and used to windrow the beets, where they may be picked up and loaded with the loading unit.

A further object of the invention is the provision of a machine of this character, wherein the construction thereof is unique, compact, automatic in the working thereof, and novel in its entirety.

A still further object of the invention is the provision of a machine of this character, which is comparatively simple in construction, thoroughly reliable and efficient in operation, strong, durable, easy of operation, economical in the working thereof, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 2 is a top plan view partly broken away;

Figure 3 is a sectional view on the line 3—3 of Figure 1 with a portion of the sprocket chains removed;

Figure 4 is a modified form of the invention;

Figure 5 is a detailed view of the standards shown in Figure 3;

Figure 6 is a sectional view on the line 6—6 of Figure 5;

Figure 7 is a sectional view on the line 7—7 of Figure 1 and

Figure 8 is a side view of the fore part of the machine.

Figure 1:
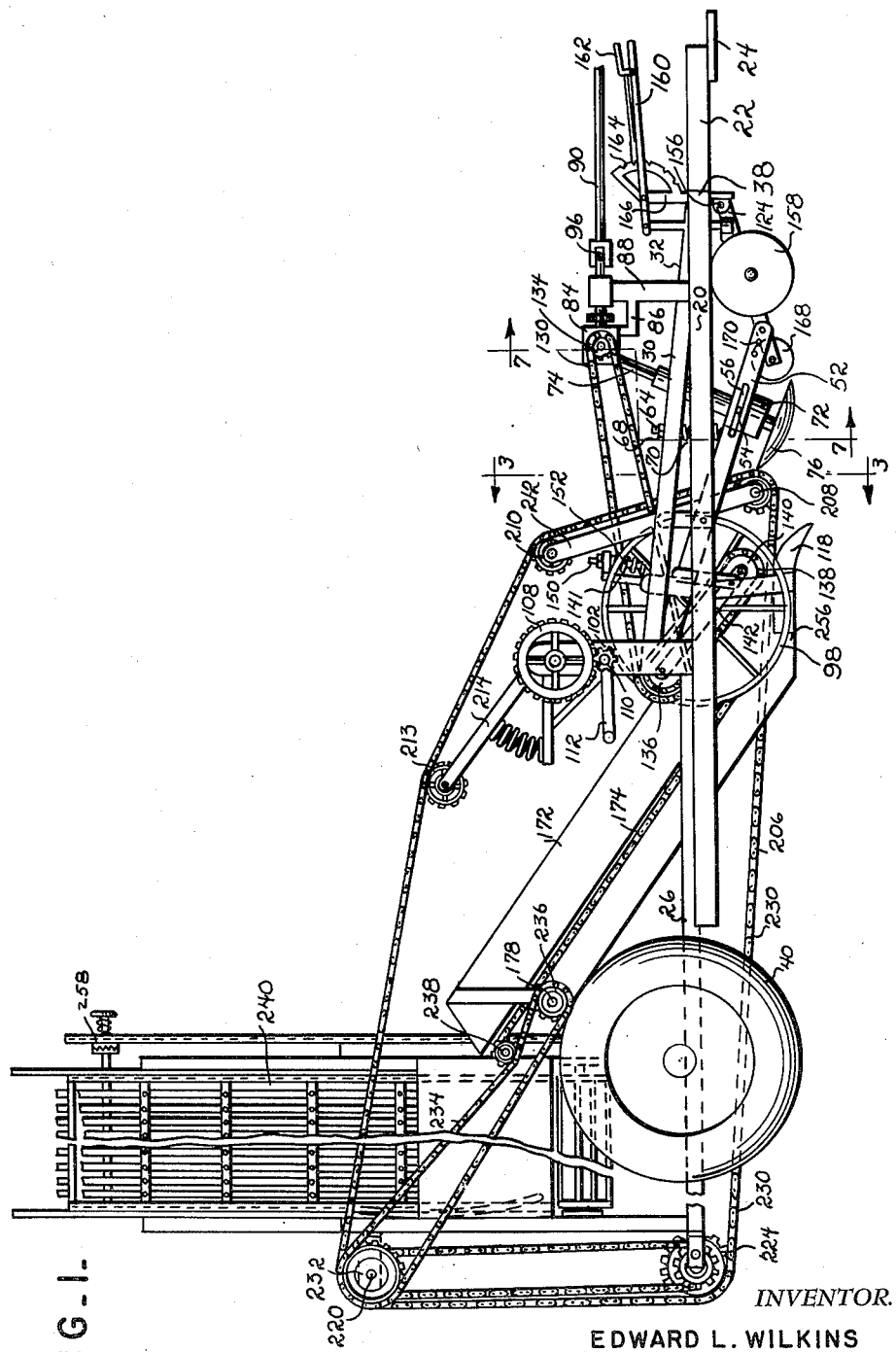
Figure 1 is a side elevation of the machine constructed in accordance with the invention.

Referring to the drawings in detail, the reference numeral 20 designates generally a main supporting frame of the beet harvester machine, and includes a forwardly tapered front hitch end 22, its center hitch 24 being for the purpose of detachable connection with a tractor or the like (not shown), for the draft of the machine through a crop of growing beets. Hinged or otherwise pivotally connected to this main frame 20 at the rear thereof is a vertically swinging wheeled rear frame 26, its pivotal connection 28 being of a detachable type. Within this main frame 20 is a vertically swinging beet topper and lifter unit comprising side-by-side parallel double-yoke frames 30 which at their forward ends have pivot arms 32, these being pivoted at 34 to bearings 36 on the cross sill 38 at the front end 22 of the frame 20.

The rear frame 26 supports broad-tread traction wheels 40, which are journalled on stub axles 42 fixed to the said frame, having a lateral substantially right-angular spread area 44 beyond the main frame 20, the axles 42 being joined thereto. The hinge connections 28 between the main frame 20 and the rear frame 26 are preferably medially of the latter. At the forward end of this rear frame 26 are coupling chains suspended from the rear ends of the yoke frames 30 for the loose connection therebetween, so that when the frames 30 are raised or lowered, similar movement will be imparted to the forward end of the rear frame 26.

Secured centrally of the rearmost yoke portions 46 of the frames 30 are transverse shafts 48 (Fig. 8) on which are mounted the downwardly extending parallel arms 50 which are pivotally connected at 51 to hangers 52 in which are mounted, by means of oppositely extending pins 54, being received in elongated slots 56, the plates 58 (Fig. 7), having opposed apertured ears 60, for hanger eyes 62 of suspension rods 64, these being adjustably connected with retaining plates 66 secured to the frames 30 by means of nuts 68, and a coil spring 70 is mounted on the rods for the tensioning of the hangers 52. Mounted on the plates 66 are the embracing hubs 72 for the power shafts 74 of concavo-convex disk type rotatable beet top cutters 76, the shafts 74 being of the telescopic extensible kind and are driven through pinion and gear connections 78 and 80 respectively, with a distributing shaft 82 journalled through a housing 84 bracketed at 86 on a front support 88 upon the main frame 20. The distributing shaft 82 is operated from a driving shaft 90, through meshing companion gears 92 and 94 respectively, the shaft 90 being equipped with a universal joint 96 and is actuated from a power take-off (not shown) of a tractor.

The frames 30 at their rear, carry ground wheels 98 (Fig. 2), these being journalled on adjustable stub axles 100 on the said frames 30. Mounted in vertical relation to the frame 20 and the frames 30 are the upright supports 102 (Fig. 3) which are hinged by the horizontal member 104 having a transverse rod 106 journalled in the supports 102 in horizontal relation to the member 104, and on one end of the rod 106 is provided a gear 108 meshing with a gear 110 provided with a crank handle 112, these being located at one side of the supports 102, and the rod 106 has chain connection 114 with the frame 30 for the raising and lowering of the same.

Depending from the sides of the frames 30 rearwardly of the cutters 76 are oval shaped downwardly curved convergent standards 116 (Figs. 3 and 8) adjustably carrying at their free lower ends forwardly directed beet lifter shovels or blades 118 (see also Figs. 1 and 2), which function to penetrate the soil and extract growing beets therefrom on the advancement of the machine, the shovels 118 being connected to the standards 116 by bolts 120, and the standards have apertured ears 122 at the lower ends thereof to receive the bolt 124, and a set screw 125 tensions the shovels or blades between the bolts 120 and 124.

Mounted transversely of the frames 30 in bearings 126, one at each end thereof, is a shaft 128, and the shaft is driven by a chain drive 130 trained over sprockets 132 on shaft 128, and sprocket 134 on shaft 82. Shaft 128 has parallel sprockets 136 thereon, having chain drive connections 138 with aligned parallel sprockets 140 journalled in the depending parallel arms 142 mounted on the shaft 128. These chains run directly over each row, and between the shovels 118 as shown more clearly in Fig. 3. The arms 142 are supported at their lower ends by the yokes 144, as shown in Fig. 8 having the rods 146 connected to the arms at 148, and to the yokes by a nut 150, and a coil spring 152 on the rods tensions the arms 142 to hold the chain firmly on the beets. The chain is used to hook the beets at the proper time to pull them back to the elevator.

Arranged at opposite sides of the path of the cutters 76 and in advance of the same on the frame 20 are coulters 158 which are vertically adjustable by a throw lever 160 provided with a hand release latch 162 engaging a stationary keeper segment 164, the latter being on an upright 166 for this lever 160.

Hinged to the cross sill 38 of the frame 20 at 156 are rearwardly directed vertically swingable carriers 154 for vertically adjustable wheels 168 which are adjustably connected by means of apertures 170 with the hinges 52, and each wheel 168 co-acts with the companion cutter 72 to regulate the depth of top cutting of the beets by the latter. The carriers by such connection do not interfere with the movement of the said cutter on the raising and lowering of the frame 30.

On the rear frame 26 at the forward portion thereof is a forwardly inclined conveyor 172, having endless parallel elevators 174 built therein, which are provided with transverse lift slats 176. The elevators 174 are driven from a shaft 178 by means of sprocket chains 180, and the shaft 178 is driven from a shaft 182 by gears 184 mounted in a box 186. The shaft 182 is extensible, sections of the latter being provided with universal joints 188 and this shaft 182 is driven by chain and sprocket connections 190 and 192 respectively, with the power shaft 90. One of the sections of the shaft 182 is journalled at 194 while the other section is journalled at 196 in a fork 198 of a cross support 200 on the frame 20. The lower roller of the elevators 174 has driving connections at 202 with the horizontally disposed beaters 204 journalled in the front open mouth of the said conveyor 172, adjacent the lower ends of the conveyors 174.

Extending longitudinally of the conveyor 172, intermediate the elevators 174 is a chain drive 206 which keeps the elevators from clogging up between the shovels 118. This chain runs over the top of the elevators, down between the shovels at the center thereof, and back under the frame 20. This chain passes over sprockets 208 and 210, which are mounted at opposite ends of the support 212 and sprocket 213, journalled at the end of parallel arms 214 hinged at 216 to the member 104 and then over sprocket 218 on shaft 220 journalled in arms 222, and sprocket 224 on shaft 226 journalled in arms 228. This chain has hooks 230 on it to pull the tops back to keep them from clogging, and the chain is driven by sprocket 232 having chain drive connection 234 with a sprocket 236 on the shaft 178, and an idle sprocket 238 is provided to change the direction of travel of the chain 206, which travels in any opposite direction from the elevators. The support 212 is secured between the frames 30, and can be adjusted up and down as well as forwardly and rearwardly.

At the rear end of the frame 26 crosswise with respect to the conveyor 172 and beneath its high end thereof, is a transferring apron or conveyor 240, its top stretch 242 being horizontally arranged, and this conveyor 240 has driving connections 244 with a sprocket and chain arrangement at 246 and 248 respectively of a loading elevator 250, the latter being driven from connections 252 with the shaft 182. A roller 254 acts on the horizontal stretch 242 of the conveyor 240 to maintain the said stretch so disposed. The load of the elevator 250 is delivered from its high end laterally to one side of the machine, that is to say, the frame 20 thereof.

At the mouth end of the elevator or conveyor 172 are runners 256 which contact with the ground to travel thereon. There are slip-clutches 258 and 260 respectively provided in the connections hereinbefore described.

In Figure 4, the shaft 128 is journalled in the hangers 328 which are adjustably mounted in the sleeve 330 by means of screws 332, and sprockets 136 on shaft 128 are positioned on opposite sides of the eye 334 on the sleeve 330 in which is mounted the hanger 336 having the forked end 338 for connection to the frames 30, and a compression spring 338 is mounted thereon and shovels 118 are mounted as previously described, and this structure may be used to replace the structure shown in Figure 4.

The wheels 40 support the entire machine at its rear, while the forward portion of the machine is coupled to the tractor and is supported thereby, in addition to the support the machine will have from the wheels 98 and 158, if any support may be had therefrom.

The machine is a complete harvesting machine to top, pull and load beets into a truck or wagon, and the topping unit is built so it can be disconnected and used to windrow the beets, where they may be picked up and loaded with the loading unit, the disconnection of these units being had at 28.

The machine in its entirety is pulled astraddle of two rows of growing beets with a tractor. The hitch to the tractor is had at 24. The main frame 20 carries the topping and pulling mechanism, as well as the wheeled frame 26. The cutters 76 cut the tops from the beets as the machine is advanced, while the shovels or blades 118 lift the growing beets from the soil, and the coulters 158 run on each side of the beet rows to trim the leaves on the side thereof. The wheels 168 for companion cutters 76 regulate the depth of top cutting of the beets.

The frames 30 can be raised with the ground wheels 98 and thus rendering the topping and lifting mechanisms inactive for their purposes.

The wheels 46 support the loading unit and also carry the whole machine when not in operation, the front of the said machine being supported by the tractor.

The points of the lifting shovels or blades are so constructed that as they run under the beets, they lift them from the ground. The lifted beets are pushed by the chains 138 and picked up by the beater 204, which throws the free beets onto the elevator 172 and this elevator delivers them to the screening transfer apron 242 which takes out the dirt and delivers the beets to the loading mechanism 250 which carries them to a truck or wagon. The machine in the working thereof requires a single attendant.

It is believed that from the foregoing description, the construction and operation of the machine will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. In a beet harvester, the combination of a main frame, a yoke-frame pivoted to said main frame, a pair of arms pivoted to said yoke-frame and depending therefrom, a pair of hangers pivotally connected to said arms, said hangers being provided with longitudinally extending elongated slots, a supporting plate between said hangers, pins extending from said plate and slidably mounted in said slots, a hub carried by said supporting plate, a telescoping shaft rotatably supported by said hub, a disk cutter attached to one end of said telescoping shaft, means on said main frame drivingly engaging the opposite end of said telescoping shaft, a retaining plate on said yoke-frame, resilient means connected to said retaining plate and said supporting plate biasing the latter away from said yoke-frame, carriers pivoted to said main frame and directed toward said hangers, an adjusting wheel pivoted on said carriers and adapted to engage the ground over which the beet harvester travels, relatively spaced apertures in said hangers, and means coacting with said apertures for adjustably and pivotally connecting said carriers to said hangers whereby the height of said disk cutter above the ground over which the adjusting wheel travels is regulated.

2. In the combination of claim 1 wherein the resilient means includes apertured ears on the supporting plate, a suspension rod pivoted to said ears and slidable through the retaining plate, a coil spring in compression about said rod between said plates, and securing means on said rod above said plate for limiting movement thereof through said retaining plate.

3. In the combination of claim 1, and upright supports on said main frame, a rod thereon, a flexible means carried thereby and attached to the yoke-frame, manually-operable means on said shaft for rotating the same whereby the yoke-frame may be raised or lowered relative to said main frame.

EDWARD L. WILKINS.

REFERENCES CITED

The following references are of record in the file of this patent:

UNITED STATES PATENTS

| Number | Name | Date |
|---|---|---|
| 1,235,490 | Kramer | July 31, 1917 |
| 1,462,486 | Devey | July 24, 1923 |
| 2,072,186 | Sishc | Mar. 2, 1937 |
| 2,376,950 | Wilkins | May 29, 1945 |

FOREIGN PATENTS

| Number | Country | Date |
|---|---|---|
| 426,247 | France | Apr. 27, 1911 |
| 16,743 | France | Jan. 30, 1913 |
| | (Addition to 426,247) | |